(12) United States Patent
Fernandez

(10) Patent No.: US 11,048,827 B2
(45) Date of Patent: Jun. 29, 2021

(54) PROTECTION SYSTEMS FOR PORTABLE DEVICES

(71) Applicant: Valeo Cases LLC, Portland, OR (US)

(72) Inventor: Juan Fernandez, Portland, OR (US)

(73) Assignee: Valeo Cases LLC, Windermere, FL (US)

(*) Notice: Subject to any disclaimer, the term of this patent is extended or adjusted under 35 U.S.C. 154(b) by 0 days.

(21) Appl. No.: 16/278,011

(22) Filed: Feb. 15, 2019

(65) Prior Publication Data

US 2019/0384940 A1    Dec. 19, 2019

Related U.S. Application Data

(60) Provisional application No. 62/631,415, filed on Feb. 15, 2018.

(51) Int. Cl.

| | |
|---|---|
| *G11B 33/08* | (2006.01) |
| *A45C 11/00* | (2006.01) |
| *G06F 21/84* | (2013.01) |
| *G06F 1/16* | (2006.01) |

(52) U.S. Cl.
CPC ............ *G06F 21/84* (2013.01); *G06F 1/1679* (2013.01); *G06F 1/1681* (2013.01); *G11B 33/08* (2013.01); *A45C 2011/003* (2013.01)

(58) Field of Classification Search
CPC ...... G06F 21/84; G06F 1/1679; G06F 1/1681; G11B 33/08; A45C 2011/003; A45C 11/00; A45C 13/00; H05K 7/14; H04N 7/01
See application file for complete search history.

(56) References Cited

U.S. PATENT DOCUMENTS

| | | | |
|---|---|---|---|
| 5,535,092 A | 7/1996 | Bang | |
| 6,567,265 B1* | 5/2003 | Yamamura | G11B 33/08 206/523 |
| 6,809,916 B2* | 10/2004 | Nakata | F16F 1/025 361/115 |
| 7,471,509 B1 | 12/2008 | Oliver | |
| 9,182,785 B2* | 11/2015 | Wyner | A45C 11/00 |
| 10,082,835 B2* | 9/2018 | Hangsleben | G06F 1/1656 |
| 2005/0047077 A1 | 3/2005 | Koh et al. | |
| 2012/0175489 A1 | 7/2012 | Taylor et al. | |
| 2014/0334077 A1 | 11/2014 | Kwong | |
| 2015/0108030 A1 | 4/2015 | Yin | |

OTHER PUBLICATIONS

International Search Report and Written Opinion of the International Searching Authority for International Patent Application No. PCT/US2019/018259, dated May 8, 2019.

* cited by examiner

*Primary Examiner* — Michael C Zarroli

(57) ABSTRACT

A protection system for portable electronic devices may include a first impact absorbing panel, a second impact absorbing panel, and multiple spacers adapted to hold the panels apart to accommodate the thickness of a portable electronic device inserted between the panels. The system may include a first rigid shell having multiple attachment slots around its periphery, a first impact absorbing material on the inner side of the first shell, a second rigid shell having multiple attachment slots around its periphery, a second impact absorbing material on the inner side of the second shell, multiple spacers adapted to attach to the shells at the attachment slots, wherein the spacers hold the panels apart with their inner sides facing each other, thereby forming a protected space for the portable electronic devices between the shells and spacers.

10 Claims, 9 Drawing Sheets

PROTECTION SYSTEMS FOR PORTABLE DEVICES

CROSS-REFERENCE TO RELATED APPLICATIONS

This application claims priority from U.S. Provisional Patent Application Ser. No. 62/631,415 filed Feb. 15, 2018 which is incorporated by reference.

COPYRIGHTS

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Protective cases for portable electronic devices such as laptop computers, tablets, and smart phones are most often custom designed to fit a specific model of device. Multi-device or universal fit cases are available, but they tend provide poor fit or performance. Even custom fit cases often typically provide only a minimal amount of protection from stress or shock such as impact forces.

SUMMARY

Some of the inventive principles of this patent application relate to a protection system for portable electronic devices in which the protection system includes a first impact absorbing panel, a second impact absorbing panel, and multiple spacers adapted to hold the panels apart to accommodate the thickness of a portable electronic device inserted between the panels. The spacers and panels may be adapted to accommodate portable electronic devices having different thicknesses. The spacers may be repositionable to accommodate portable electronic devices having different footprints. The spacers may form impact absorbing structures with the panels. The structures may absorb impact by causing a material in at least one of the panels to deform, or by causing a rigid material in at least one of the panels to fracture. The structures may absorb impact by causing one or more of the spacers to move relative to at least one of the panels.

Some other inventive principles of this patent application relate to a protection system for portable electronic devices in which the protection system includes a first rigid shell having multiple attachment slots around its periphery, a first impact absorbing material on the inner side of the first shell, a second rigid shell having multiple attachment slots around its periphery, a second impact absorbing material on the inner side of the second shell, multiple spacers adapted to attach to the shells at the attachment slots, wherein the spacers hold the panels apart with their inner sides facing each other, thereby forming a protected space for the portable electronic devices between the shells and spacers. The slots may be arranged to enable the spacers to be repositioned on the shells. The slots may be arranged to allow the spacers to move in response to an impact force. At least some of the slots may include one or more linear sections arranged along a line having a geometric component that runs generally from the center of the shell to the periphery of the shell. At least one of the shells may include an access slot to enable a user to grip a portable electronic device to remove it from the protected space. At least some of the spacers may include posts having threads to enable the posts to be attached to the shells using fasteners. The spacers may have internal threads, and the fasteners may include screws. The system may include a bumper adapted to cushion the edges of the shells, and the bumper may include two grooves to engage the edges of the shells.

Some other inventive principles of this patent application relate to a method including attaching a plurality of spacers to an inner side of a first shell having impact absorbing material, and attaching the spacers to an inner side of a second shell having impact absorbing material, thereby creating a protected space for portable electronic devices between the first and second shells. The method may include sliding a portable electronic device into the protected space between the first and second shells. The method may include adjusting the position of the spacers on the first and second shells to accommodate the size and shape of the portable electronic device. Adjusting the position of the spacers may include moving the location of the spacers along slots in the first and second shells. The method may include adjusting the length of the spacers to accommodate the thickness of the portable electronic device. Adjusting the length of the spacers may include using spacers with different lengths.

DETAILED DESCRIPTION

Figure 1:
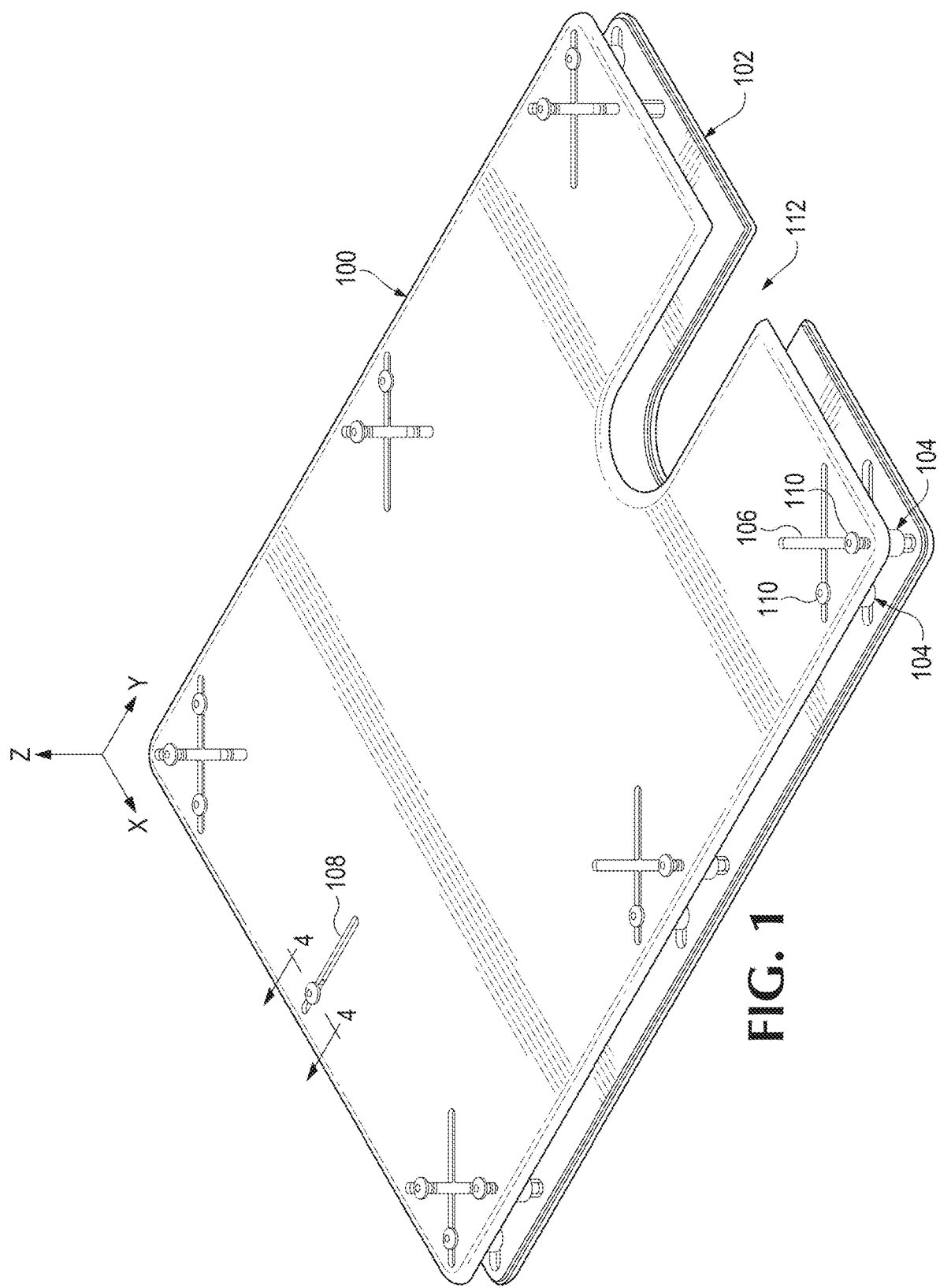
FIG. 1 illustrates a first embodiment of a protection system for portable electronic devices according to the inventive principles of this patent disclosure.
Figure 14:
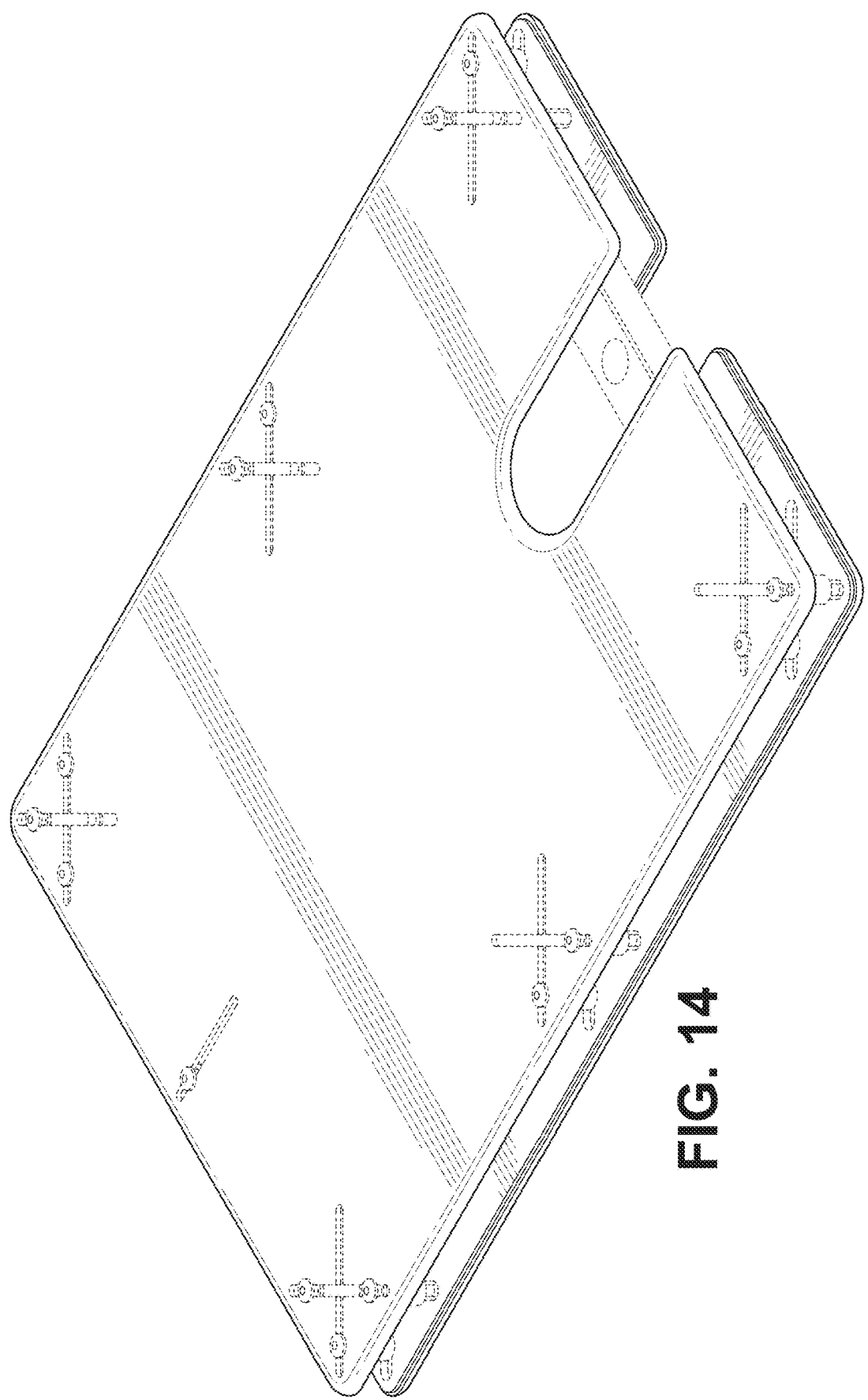
FIG. 14 is a perspective view of a design for a protection system for portable electronic devices according to the inventive principles of this patent disclosure.

FIG. 1 illustrates a first example embodiment of a protection system for portable electronic devices according to the inventive principles of this patent disclosure. The system of FIG. 1 includes a first impact absorbing panel 100, a second impact absorbing panel 102, and multiple spacers 104 adapted to hold the panels apart to form a case that accommodates the thickness of a portable electronic device inserted between the panels. (FIG. 14 shows an example of a device inserted into the case between the panels.)

Referring again to FIG. 1, the spacers 104 and panels 100,102 may be adapted to accommodate portable electronic devices having different thicknesses and footprints. The distance between the panels may be adjusted by changing the lengths of the spacers 104, thereby accommodating devices of different thicknesses as explained in more detail below. The locations of the spacers 104 may be changed by moving them along the X-shaped attachment slots 106 and the single attachment slot 108, thereby accommodating devices of different footprints as explained in more detail below. In the example of FIG. 1, the spacers are secured to the panels with screws 110. An access slot 112 is provided to enable a user to grip a portable electronic device to remove it from the protected space. Not all spacers and slots are numbered to avoid obscuring the drawing.

Figure 2:
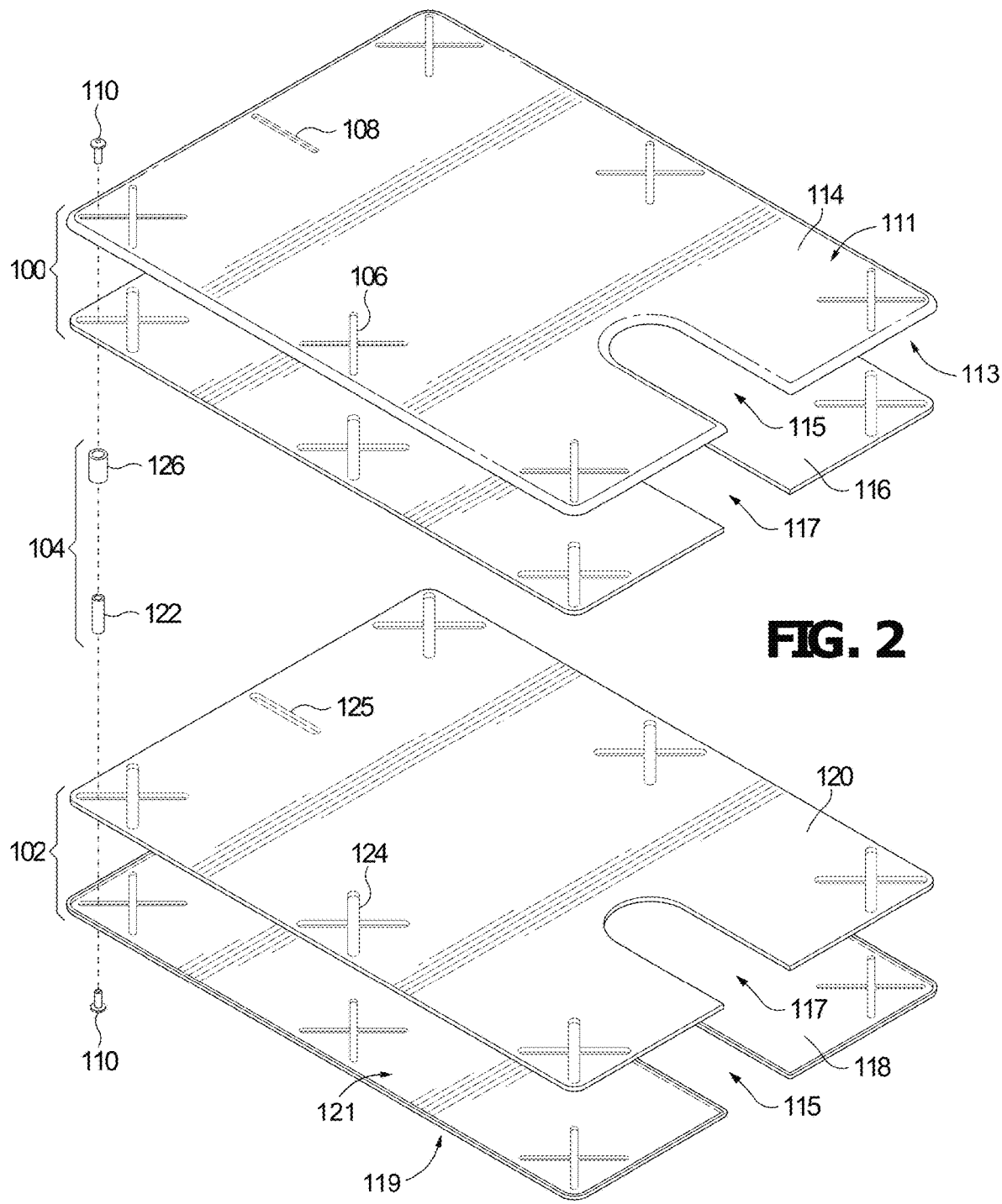
FIG. 2 is an exploded view of the embodiment of FIG. 1 according to the inventive principles of this patent disclosure.

FIG. 2 is an exploded view of the embodiment of FIG. 1 where only one of the spacers 104 is illustrated to avoid obscuring the drawing. The top panel 100 includes a first rigid shell 114 having multiple attachment slots 106 and 108 around its outer periphery 111 and inner periphery 113 and a first impact absorbing material 116 that attaches to the inner side of the first shell 114. The bottom panel 102 includes a second rigid shell 118 having multiple attachment slots 106 and 108 around its outer periphery 119 and inner periphery 121 and a second impact absorbing material 120 on the inner side of the second shell 118. The spacers 104 are adapted to attach to the shells 114 and 118 at the attachment slots 106 and 108 such that the spacers hold the shells apart with their inner sides facing each other, thereby forming a protected space for the portable electronic devices between the shells and spacers.

In the example of FIG. 2, each spacer 104 includes a post 122 having an internal thread at either end to mate with the external threads on screws 110 which pass through the slots in the shells, thereby securing the spacers to the shells. Each spacer 104 also includes a bumper 126 to provide additional cushioning to the portable device.

Each of the shells 114 and 118 includes an access slot 115 and each of the impact absorbing materials 116 and 120 includes an access slot 117. The impact absorbing materials 116 and 120 also include slots 124 and 125 that align with corresponding slots 106 and 108, respectively, in the shells.

Figure 3:
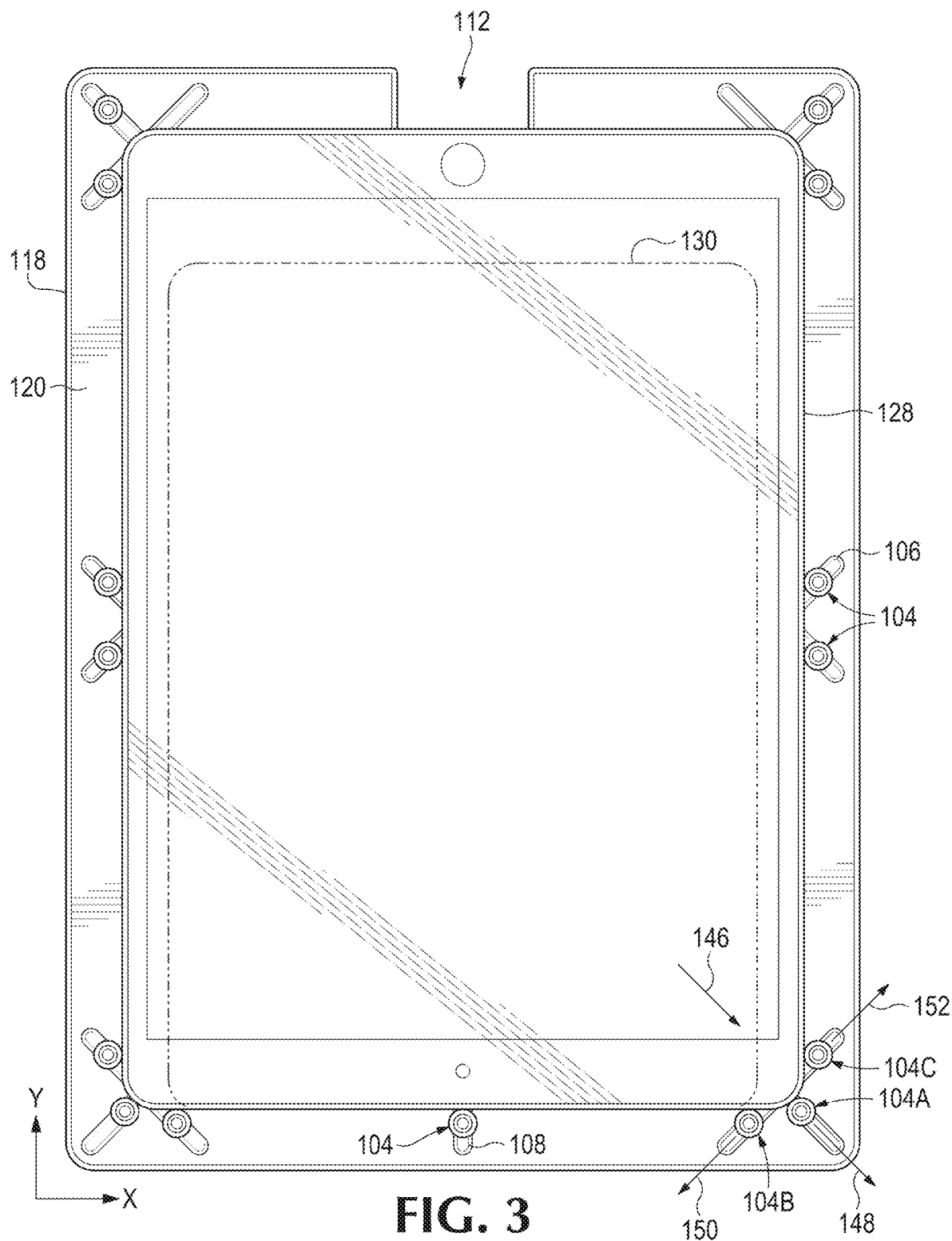
FIG. 3 is a plan view of the embodiment of FIG. 1 showing the top panel removed and a portable electronic device placed in the protected space between the spacers according to the inventive principles of this patent disclosure.

FIG. 3 is a plan view of the embodiment of FIG. 1 showing the top panel 100 removed and a portable electronic device 128 placed in the protected space between the spacers 104. Not all spacers and slots are numbered to avoid obscuring the drawing. In the example of FIG. 3, the spacers 104 are positioned directly up against the device 128 to prevent any movement of the device within the case. Depending on the user's preferences, the spacers 104 may be moved outward away from the device 128 along the slots 106 and 108 to provide a gap between the device and the spacers. The spacers may be moved by loosening the screws 110 and then retightening them after the spacers have been repositioned.

A second portable electronic device 130, which has a smaller footprint than the first device 128 is shown in phantom outline in FIG. 3. The spacers 104 may be moved inward along the slots 106 and 108 to reposition them against the smaller device 130. If the footprint of any device would result in any of the spacers being positioned directly in the center of one of the X-shaped slots 106, the device may be moved laterally in either or both of the X or Y directions relative to the shells so that the spacers can be away from the centers of any of the X-shaped slots.

Figure 4:
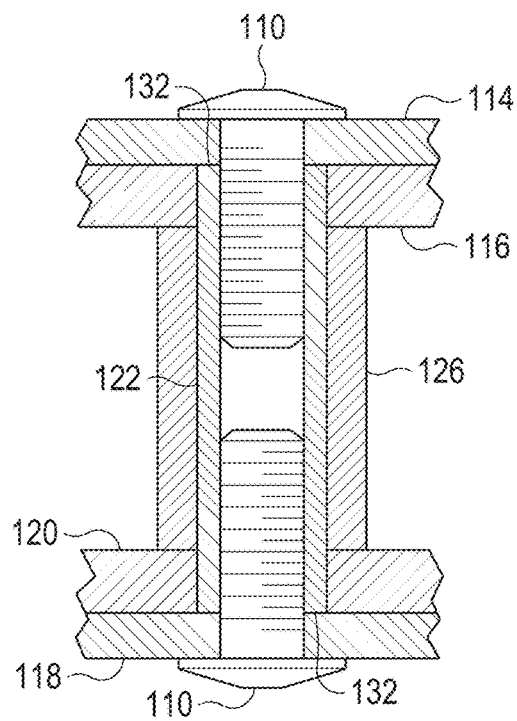
FIG. 4 is a cross-sectional view of an embodiment of a spacer, panels and fasteners according to the inventive principles of this patent disclosure.

FIG. 4 is a cross-sectional view of an embodiment of a spacer, panels and fasteners according to the inventive principles of this patent disclosure. The view of FIG. 4 is taken through a cross-section of the embodiment of FIG. 1 as shown by arrows 4. In the example embodiment of FIG. 4, the slots 106 and 108 in the shells 114 and 118 are wide enough to enable the threaded portion of the screws 110 to pass through without interference while still being narrow enough to form a shoulder at surfaces 132 to enable the ends of posts 122 to rest directly against the shells 114 and 118 to provide a rigid connection between the spacers and panels when the screws 110 are tightened into to the posts. The slots 124 and 125 in the impact absorbing materials 116 and 120 are wider than the slots 106 and 108 in the shells 114 and 118 to enable the posts 122 to pass through to the shells without interference from the impact absorbing materials. In some embodiments, the screws may be socket head cap screws.

Although the impact absorbing materials 116 and 120 are shown directly abutting the post 122, there can be some space between the impact absorbing materials and the posts, i.e., the slots 124 and 125 can be made wider, without adverse effects. Likewise, the bumper 126 is shown directly abutting the impact absorbing materials 116 and 120, but the bumper may be made shorter, i.e., creating space between the bumper and impact absorbing materials, or longer, i.e., causing deformation of the bumper and/or impact absorbing materials, without adverse effects.

In some embodiments, the shells 114 and 118 may be fabricated from materials that provide a high level of rigidity, strength and/or impact resistance such as reinforced composite panels. For example, the shells may be molded from carbon fibers that are woven or otherwise arranged to provide reinforcement and impregnated with epoxy, polyester, vinylester or other suitable resin. Alternative fibers such as Kevlar or glass fibers may also be used. Other suitable materials for the shells include aluminum, titanium, and various engineering plastics.

In some embodiments, the impact absorbing materials 116 and 120 and/or bumpers 126 may be fabricated from non-linear or non-Newtonian polymers or other foams or elastomeric materials to provide a high level of impact absorption, dissipation, and/or resistance. The impact absorbing materials 116 and 120 may be permanently or removably attached to the shells 114 and 118 through any suitable techniques such as adhesives, tapes, hook-and-loop fasteners, etc. Other suitable materials include neoprene or other engineering elastomers. The impact absorbing materials may be formed integrally with the shells, for example by creating a hardness gradient in a single material that produces a rigid shell on one side that transitions to a softer cushion on the other.

Figure 5:
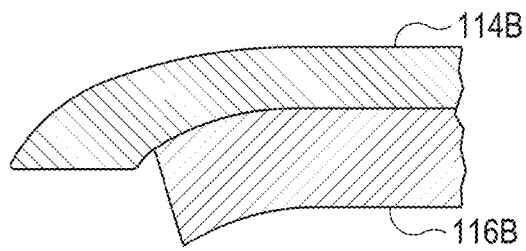
FIGS. 5-8 are cross-sectional views illustrating some possible profiles for the edges of shells and impact absorbing materials according to the inventive principles of this patent disclosure.
Figure 6:
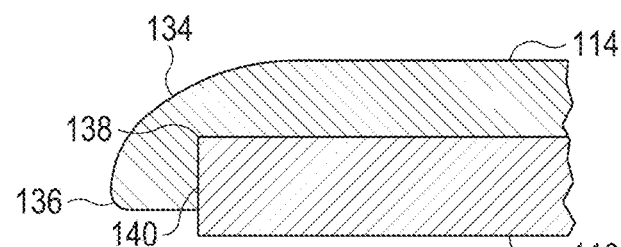

FIGS. 5-8 are cross-sectional views illustrating some possible profiles for the edges of shells and impact absorbing materials according to the inventive principles of this patent disclosure. The embodiment of FIG. 6 is the profile used in most of the embodiments of shells illustrated throughout this patent disclosure. The profile of the embodiment of FIG. 6 has a major radius curvature 134 and minor radius curvature 136 that have been found to provide an appealing touch surface to some consumers, while the sharp inner corner 138 and vertical surface 140 form a convenient well for positioning and/or holding the impact absorbing material 116 in place.

Figure 8:
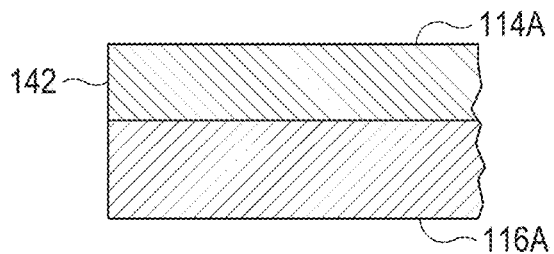

In the embodiment of FIG. 8, the shell 114A has a flat outer edge 142 that may provide a more technical feel that appeals to some other consumers. The impact absorbing material 116A may be positioned flush with the edge 142 as shown in FIG. 8, or it may be recessed from the edge in other embodiments. The flat edge 142 may also make the shell less expensive to fabricate compared to other profiles.

Figure 7:
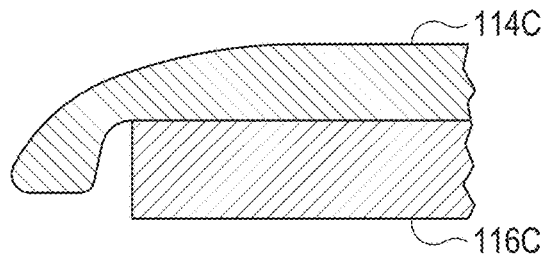

FIGS. 5 and 7 illustrate other alternative embodiments of edge profiles for shells 114B and 114C, and impact absorbing materials 116B and 116C. The embodiments of FIGS. 5 and 7 may fall somewhere between the embodiments of FIGS. 6 and 8 in terms of cost to manufacture. They may also provide touch surfaces that appeal to yet other groups of consumer.

One particularly beneficial combination of materials may be the use of carbon-fiber composites for the shells 114 and a microcellular contouring material like Poron XRD from Rogers Corporation for the impact absorbing material 116. This combination may provide a high-end aesthetic feel and appearance due to the high-touch effect and tactile feedback that provides a pleasing sensation to a user.

In some embodiments, the spacers 104 may be fabricated with posts 122 made from aluminum or other metals and bumpers 126 made from neoprene or other elastomer. The spacers can be made to have adjustable lengths, for example, by having one portion with an internal thread and another portion with a mating external thread. The length of such a spacer may be adjusted by turning one portion relative to other. A locknut may be added to lock the positions of the two portions once they are adjusted to the desired length. In some embodiments, the spacers may be fabricated with posts that have external threads at either end and fastened to the shells with nuts.

In some other embodiments, the spacers may be fabricated as one-piece components with integral bumpers. For example, the spacers may be molded from a single material that is rigid enough to form a strong connection between the shells or panels, but elastic enough to act as an impact absorbing bumper to protect the device. As another example the spacers may be fabricated from a single material with a hardness gradient that is rigid on the inside to behave like a post, but more flexible on the outside to behave as a bumper.

In addition to screws or nuts as described above, the spacers may be attached to the shells or panels with any other suitable fasteners such as keyed magnets or snaps or other spring-loaded fastening devices. If screws are used, any suitable drive style may be used including security type drives such as spanner, three-wing, one-way, tamper-proof, reverse drive, etc.

The components of the embodiments described in this patent disclosure may interact in subtle and complex ways to achieve synergistic results. For example, the combination of slots and spacers may perform a dual function. Not only do the slots allow repositioning of the spacers to accommodate different portable devices, but they may also allow the spacers to move slightly along the slots in the case of an impact force that has an edgewise component (i.e., a component in the X-Y plane as shown in FIGS. 1 and 3). For example, if the case is dropped edgewise on the corner 144 in the direction of arrow 146 in FIG. 3, the impact forces may cause the spacer 104A to move in the direction of arrow 148, while the wedging action on the sides of the device 128 may cause spacers 104B and 104C to move in the directions of arrows 150 and 152, respectively. For the spacers to move, they have to overcome the forces of friction holding them in place, thereby diverting impact energy away from the device. This may be in addition to the impact absorbing action of the bumpers on the spacers.

As another example, the rigid material in the shells may also perform multiple functions as they interact with the spacers. On the portion of a shell that is inside of the spacers (i.e., over the device), the rigid shell may distribute localized impact forces over a wider area where the forces may be absorbed by more of the impact absorbing material. Outside of the spacers, however, where the rigid shell is unsupported, it may behave as more of an impact absorbing material itself. Therefore, the spacers may form a support boundary where the shell may transition from an impact distributing material to an impact absorbing material. The impact forces applied to the outer periphery of a shell may cause the shell material to deform and possibly even fracture. In the case of more rigid and frangible materials like carbon fiber, the shell may eventually fracture, whereas in the case of more flexible materials like Kevlar fiber, the shell may only deform Thus, the spacers may form various impact absorbing structures with the panels. These structures may absorb impact in various modes of operation, e.g., by causing one or more of the spacers to move relative to at least one of the panels, by causing a material in at least one of the panels to deform temporarily or permanently, and/or causing a rigid material in at least one of the panels to fracture.

Figure 9A:
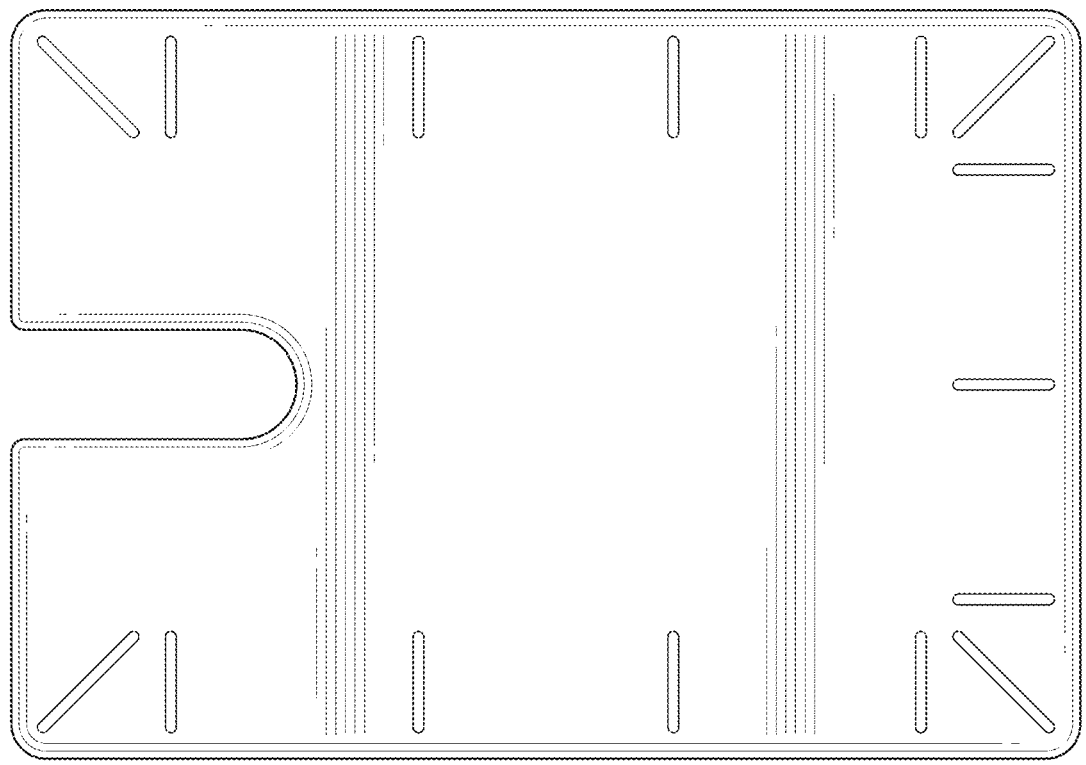
FIGS. 9, 9A and 10 illustrate some additional arrangements of attachment slots according to the inventive principles of this patent disclosure.
Figure 9:
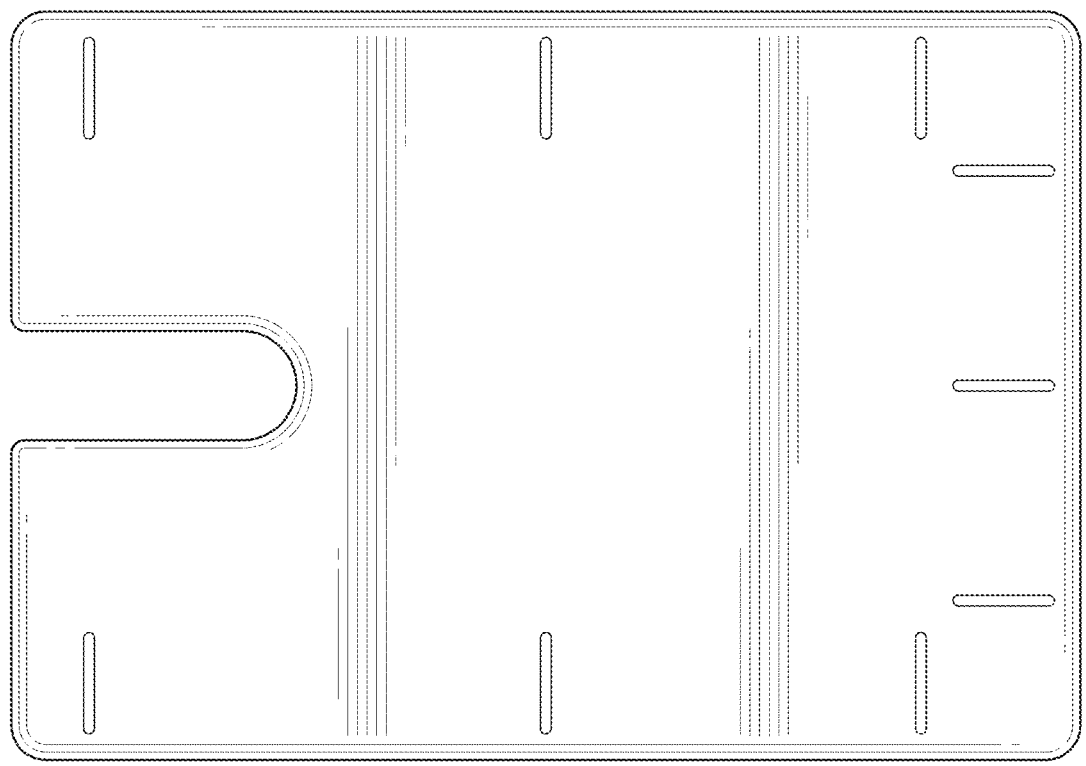
Figure 10:
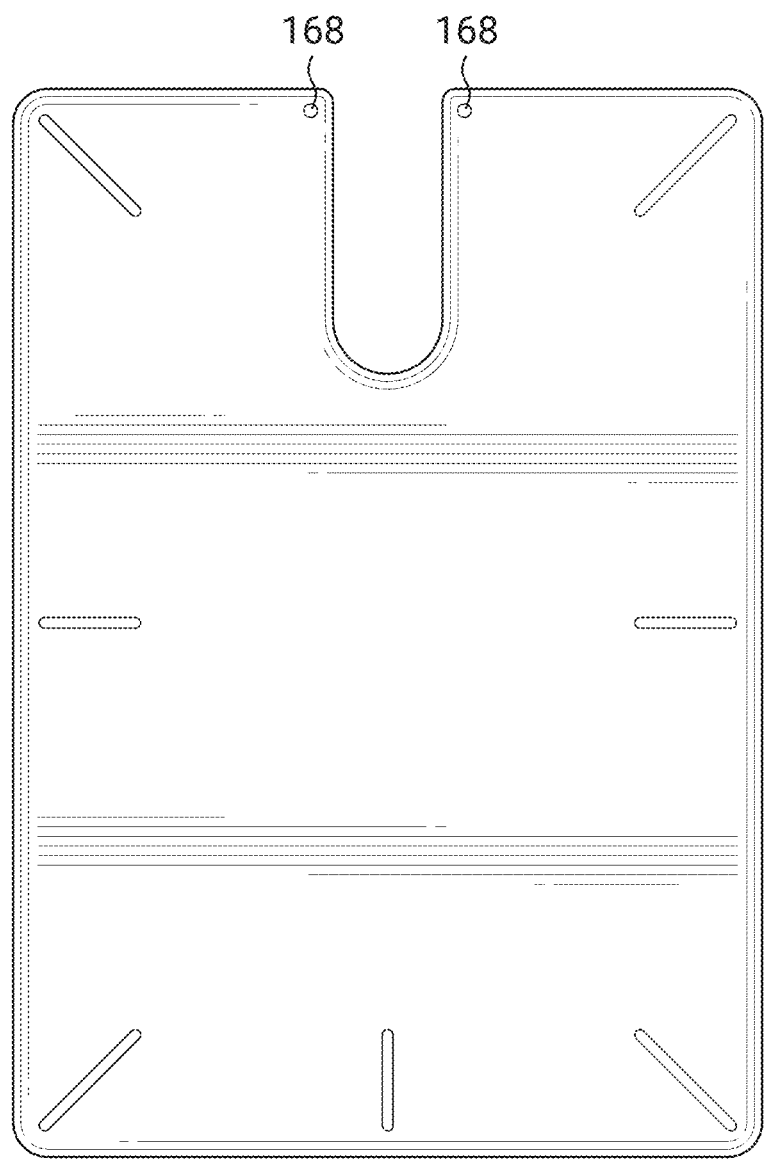

FIGS. 9, 9A and 10 illustrate some additional arrangements of attachment slots according to the inventive principles of this patent disclosure. The embodiment of FIG. 9 has slots that are perpendicular to the edges of the shells. The embodiment of FIG. 9A has a combination of perpendicular and diagonal slots and illustrates an alternative arrangement that may use the same number of spacers (15) as the embodiment of FIGS. 1-3 without having intersections in the slots. The embodiment of FIG. 10 illustrates an arrangement in which all of the slots generally radiate outward from the center or centroid of the case, which may correspond approximately with the center of mass of a device in the case.

To facilitate the impact diverting function of the slots as discussed above, at least some of the slots may preferably include one or more sections arranged at least partially along a line having a geometric component that runs generally from the center of the case to the periphery of the case. The slots need not be linear. For example, one or more of the slots may be curved in a manner that causes a non-linear resistance to the motion of a spacer as it slides in the slot in response to impact forces. This may be implemented for example with a slot that, at the inner part of the periphery, is arranged along a reference line that runs generally from the center of the case to the periphery of the case, but as the slot extends toward the outer part of the periphery, it curves away from the reference line to create progressively more resistance to movement of the spacer along the slot.

Figure 11:
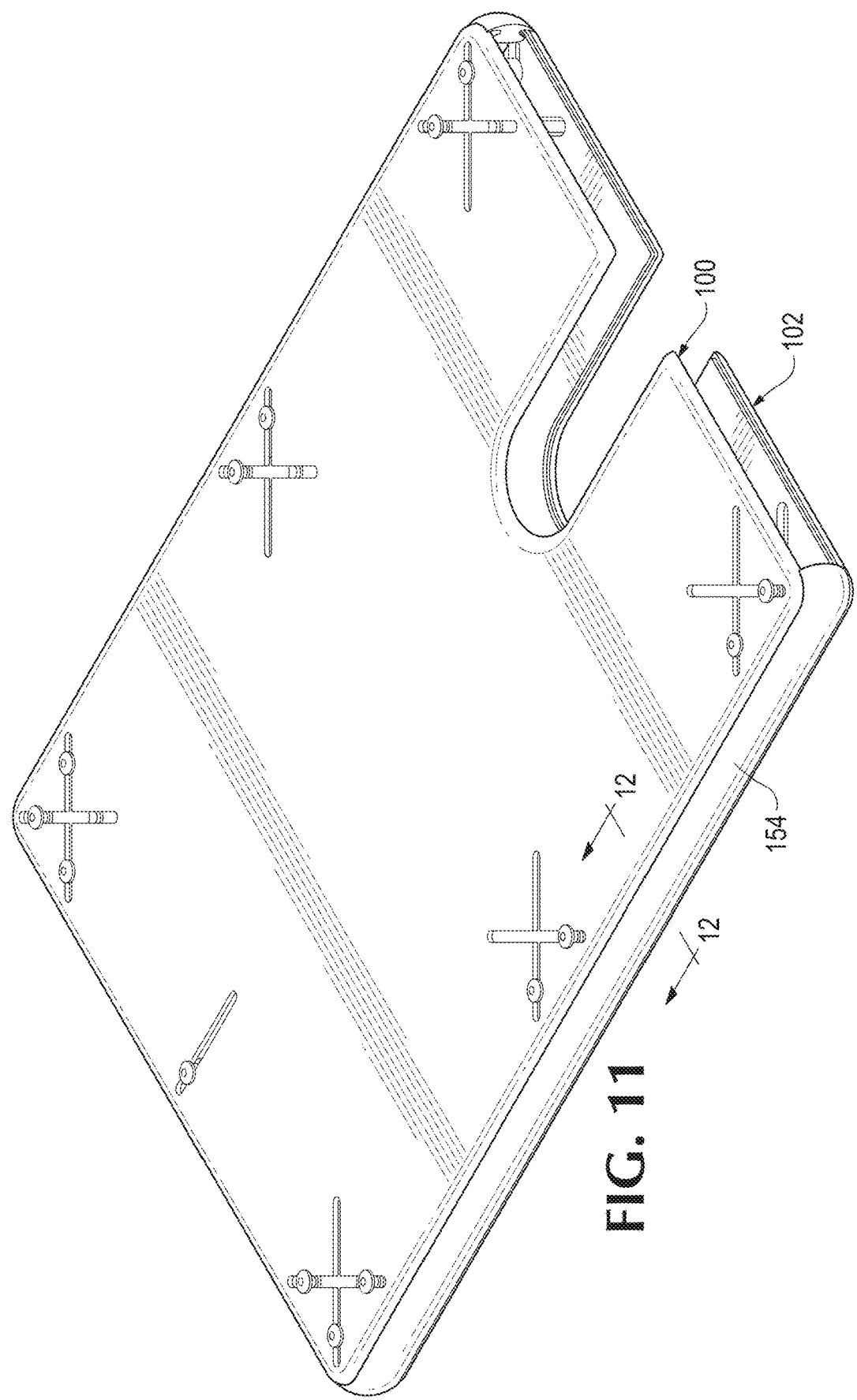
FIG. 11 illustrates an embodiment of a bumper for a protection system for portable electronic devices according to the inventive principles of this patent disclosure.

FIG. 11 illustrates an embodiment of a bumper for a protection system for portable electronic devices according to the inventive principles of this patent disclosure. For purposes of illustration, the bumper 154 is shown attached to the embodiment of a case shown in FIGS. 1-3, but the inventive principles are not limited to use with any specific case.

Figure 12:
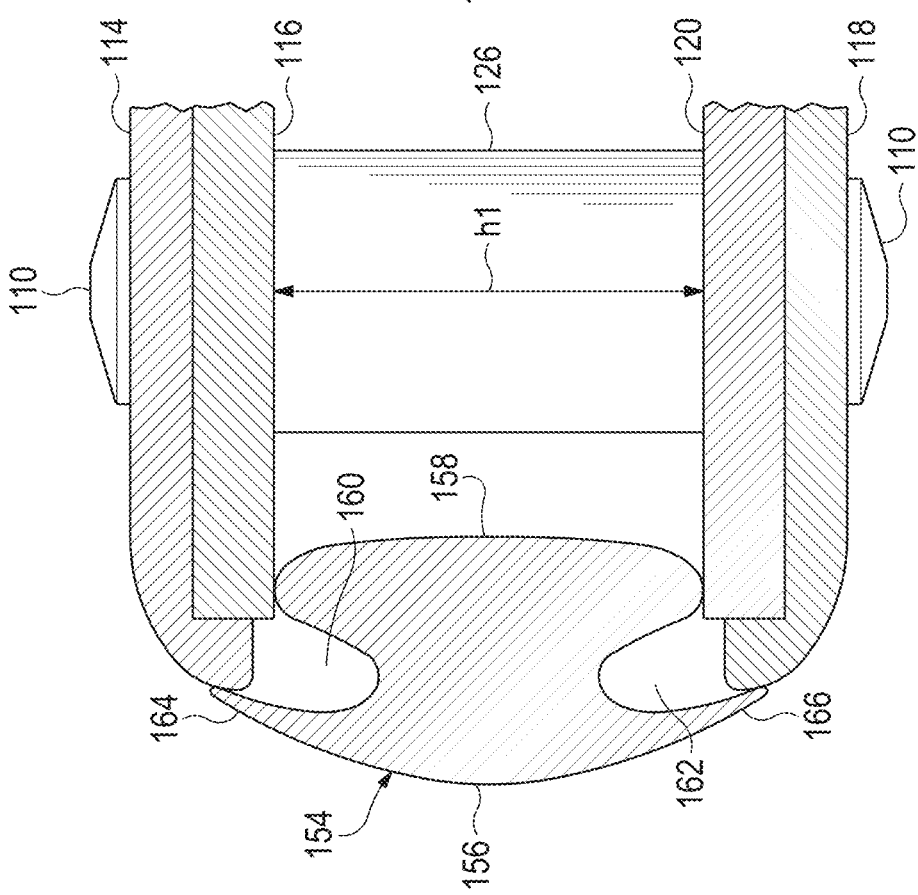

FIG. 12 is a cross-sectional view of the bumper 154 taken through the section shown by the arrows 12 in FIG. 11. In the view of FIG. 12, the spacers are sized such that h1 is the distance between the inner surfaces of the impact absorbing materials 116 and 120. The bumper 154 includes an outer portion 156 and an inner portion 158 which define an upper groove 160 and a lower groove 162, which engage the outer edges of the shells 114 and 118, respectively. In this configuration, lips 164 and 166 of the outer portion 156 overlap the outer edges of the shells 114 and 118 by a relatively small amount. The bumper 154 made from neoprene or other suitable elastomeric material.

Figure 13:
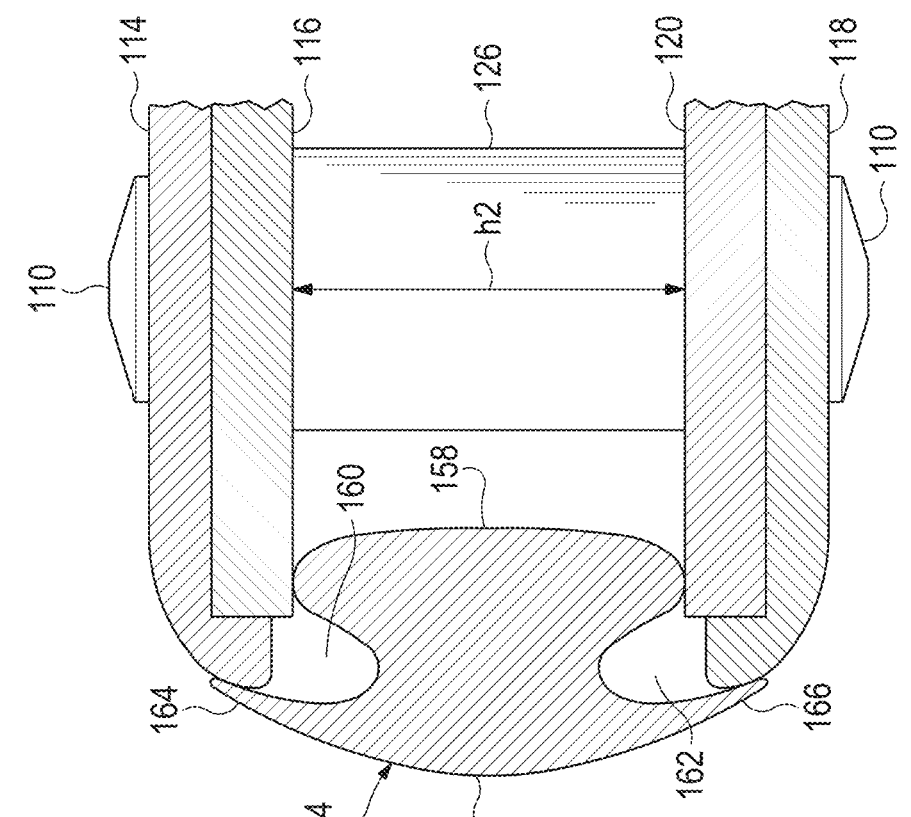
FIGS. 12 and 13 are cross-sectional views of the bumper of FIG. 11.

FIG. 13 is another cross-sectional view of the bumper 154 in which shorter spacers are used such that h2 is the relatively smaller distance between the inner surfaces of the impact absorbing materials 116 and 120. In this configuration, the outer edges of the shells 114 and 118 sink deeper into the grooves 160 and 162, and the lips 164 and 166 of the outer portion 156 overlap the outer edges of the shells by a larger amount then in FIG. 12. In FIG. 13, the inner portion 158 of the bumper 154 is shown slightly compressed by shorter distance h2, but depending on the relative hardnesses of the bumper 154 and impact absorbing materials 116 and 120, the impact absorbing materials may be compressed in addition to, or instead of, the bumper 154.

In some embodiments, one or more holes may be included to accommodate a locking device for security purposes. For example, a TSA lock may be threaded through one or more holes 168 in the panels as shown in FIG. 10. The holes may pass through both of the shells 114 and 118 and both of the protective materials 116 and 120.

In some embodiments, one or more layers of additional materials may be applied over the exposed surfaces of the impact absorbing materials 116 and 120. These inner layers may perform various functions. For example, the inner layers may protect the layers of impact absorbing materials. The inner layers be made of smooth fabric or similar coating to make it easy to slide a device into and out of the protection system. Alternatively, the inner layers may be made of a relatively grippy material to prevent the device from falling out of the protective system. In some embodiments, the inner layers may have a surface that strikes a balance between slipperiness and slip resistance to facilitate purposefully sliding the device into and out of the frame while preventing unintentional removal. In other embodiments, the impact absorbing materials 116 and 120 maybe selected to have these qualities, thereby eliminating the need for the additional inner layers of materials.

The system components described above may form an infinitely configurable enclosure offering a protective and lightweight system for keeping laptops, tablet computers and other devices safe and secure. The modular construction may allow it to be used for different size devices and grow and/or adapt over time as a user replaces and/or acquires different devices. The inventive principles may provide versatile solutions for any or all of the following types of users: individuals who cannot afford to have their laptops and/or tablet computers damaged; individuals who travel with their electronics and have to protect them within checked luggage; individuals who ride motorcycles or bicycles and need to protect their devices against sudden impacts and falls; individuals who upgrade their devices but who don't want to spend money on new cases every time they upgraded their hardware; individuals who value a high-touch and high-end enclosure for their devices; individuals who need two or more cases for multiple devices and can leverage the system's ability to be custom configured for multiple individual devices or multiple devices together protected by a single enclosure; and individuals who want added protection within their laptop bags, backpacks, luggage, and other bags.

Since the inventive principles of this patent disclosure can be modified in arrangement and detail without departing from the inventive concepts, such changes and modifications are considered to fall within the scope of the following claims.

The invention claimed is:

1. A protection system for portable electronic devices, the protection system comprising:
    a first rigid shell having an outer periphery, an inner periphery, and multiple attachment slots through the first shell between the outer and inner peripheries;
    a first impact absorbing material on the inner side of the first shell;
    a second rigid shell having an outer periphery, an inner periphery, and multiple attachment slots through the second shell between the outer and inner peripheries;
    a second impact absorbing material on the inner side of the second shell;
    multiple spacers adapted to attach to the shells at the attachment slots, wherein the spacers hold the panels apart with their inner sides facing each other, thereby forming a protected space for the portable electronic devices between the shells and spacers.

2. The system of claim 1 wherein the slots are arranged to enable the spacers to be repositioned on the shells.

3. The system of claim 2 wherein the slots are arranged to allow the spacers to move in response to an impact force.

4. The system of claim 1 wherein at least some of the slots include one or more sections arranged along a line having a geometric component that runs generally from the center of the shell to the periphery of the shell.

5. The system of claim 1 wherein at least one of the shells includes an access slot to enable a user to grip a portable electronic device to remove it from the protected space.

6. The system of claim 1 wherein at least some of the spacers include posts having threads to enable the posts to be attached to the shells using fasteners.

7. The system of claim 6 wherein:
    the spacers have internal threads; and
    the fasteners include screws.

8. The system of claim 1 wherein at least some of the spacers include bumpers.

9. The system of claim 1 further comprising a bumper adapted to cushion the edges of the shells.

10. The system of claim 9 wherein the bumper includes two grooves to engage the edges of the shells.

* * * * *